Patented July 10, 1951

2,560,053

UNITED STATES PATENT OFFICE 2,560,053

STABILIZATION OF POLYACRYLONITRILE SOLUTIONS

Myron Quentin Webb, Waynesboro, Va., assignor to E. I. du Pont de Nemours and Company, Wilmington, Del., a corporation of Delaware No Drawing. Application February 16, 1950,
Serial No. 144,590

15 Claims. (Cl. 260—32.6)

This invention relates to the preparation of solutions of acrylonitrile polymers in dimethyl formamide and similar solvents and, in particular, to the preparation of such solutions which possess an improved resistance to the formation of color upon heating.

Acrylonitrile polymers containing at least 85% of acrylonitrile in the polymer molecule are insoluble in ordinary organic solvents. It has been found, however, that dimethyl formamide serves as a useful solvent medium for these difficultly soluble polymers. The solution of the polymers in dimethyl formamide is normally effected by the use of heat. Furthermore in shaping articles, particularly filaments, yarns and films, from the solutions of these polymers in dimethyl formamide, heating is usually resorted to in order to obtain the proper solution characteristics, i. e. the proper viscosity and homogeneity. Where heat is resorted to either to form the solution of the polymer or in the manufacture of shaped articles from such solutions, a yellow or brownish yellow color is frequently developed in the solution and transmitted to the shaped article formed therefrom.

The exact mechanism which causes this color formation has not been determined with certainty. The initial appearance of color can be somewhat retarded by slurrying the polymer in an oxygen-free atmosphere, but even so an undesirable discoloration may occur when the slurry is heated to effect solutions. Metal ions in general, such as iron, copper and manganese, frequently lead to high discoloration of N,N-dimethyl formamide solutions of polyacrylonitrile. This discoloration tendency is even more apparent when the solution is subjected to heat in the presence of such metals. In addition, it is believed that the dimethyl formamide obtained from commercial sources contains certain organic amines, particularly dimethylamine, which appear to react with the polymer, particularly at elevated temperatures, to form products which impart undesirable color to the polymer solutions. The heating of dimethyl formamide during the formation of the solutions of said polymers and also the subsequent heating of the solutions just prior to converting it into articles, such as filaments, yarns and films, may cause the formation of additional compounds, such as amines, which like the amines present as impurities in dimethyl formamide, impart an undesirable degree of color to the polymer solutions and to the products produced from these solutions. These remarks relative to dimethyl formamide apply also to similar solvents, such as N-formyl morpholine, N,N-diformyl piperazine, etc. and to any solvent such as tetramethylene cyclic sulfone, gamma-butyrolactone, etc., although color formation is not serious with the non-amide type solvents.

It is an object of the present invention to minimize color formation in polymer compositions. A further object pertains to color diminutions in polymer compositions which develop color with the passage of time, particularly when solutions of the polymers are permitted to stand for a prolonged period of time, or at elevated temperatures. A further object of the invention is concerned with the diminution of color in solutions of acrylonitrile polymers and in articles produced from such solutions. An additional object relates to the production of solutions of acrylonitrile polymers and articles produced therefrom having improved color characteristics. Other objects will appear hereinafter.

The objects of this invention are accomplished by dissolving an acrylonitrile polymer in a solution of dimethyl formamide or similar solvent containing from 0.1–2% (by weight based on polymer) of a sulfoxy acid compound from the group consisting of sulfuric acid, organic sulfonic acids and hydrated salts of organic sulfonic acids and a similar amount of an organic sulfur compound that reacts as a thiol, that is, a sulfhydryl (—SH) containing substance or a substance in equilibrium with a sulfhydryl containing substance.

When used alone as heat stabilizers for acrylonitrile polymers containing at least 85% (by weight) acrylonitrile, the thiols are only slightly and insufficiently effective but when used in combination with a sulfoxy acid compound remarkable results are obtained. These results are truly remarkable because, while the sulfoxy acid compounds, such as sulfuric acid, sulfonic acids and their hydrated salts, when used alone have some effect, they are not nearly as effective as the combination.

This invention can best be illustrated by reference to the following examples in which all parts and percentages are by weight unless otherwise noted.

EXAMPLE I

In each of several glass containers, there were placed 95 parts of dimethyl formamide and 0.1 part of an organic sulfur compound which reacts as a thiol, and in some cases, 0.1 part of a phenolsulfonic acid or dimethyl formamide soluble salt of phenolsulfonic acid. The contents of each container were then slurried at room temperature with 5 parts of polyacrylonitrile having an average molecular weight of 65,000. Solution was effected in each case by warming the mixture to 75° C.

The testing of these 5% solutions of polyacrylonitrile in dimethyl formamide was carried out by heating the solution for ½ hour at 75° C. and then for 1 hour at 125° C. After each heating period the transmittancy of the solution was measured by use of a Fisher Electrophotometer, using light of 425,550 and 650 millimicrons in wave length. The color index (CI) was calculated as the average of 100 times the negative logarithm of the fraction of light transmitted for each of the three wave lengths used. The control polyacrylonitrile dissolved in dimethyl formamide without stabilizer was found to have the following color indices:

$$CI_{75°} = 10.8 \pm 0.5$$

and $$CI_{125°} = 32.5 \pm 2.8$$

Solutions whose color indices were found to be lower than these values were solutions of improved color. The results of this series of experiments are shown in Table I.

*Table I*

| | | $CI_{75°}$ | $CI_{125°}$ |
|---|---|---|---|
| 1 | Control | 10.8±0.5 | 32.5±2.8 |
| 2 | Al p-phenolsulfonate . 8 H₂O | 4.6 | 23.0 |
| 3 | o-Phenolsulfonic acid | 7.0 | 27.0 |
| 4 | 1-Thiosorbitol | 7.1 | 18.2 |
| 5 | 1-Thiosorbitol+Al p-phenolsulfonate . 8 H₂O | 2.9 | 6.8 |
| 6 | 1-Thioglycerol (50% aq. soln.) | 5.4 | 23.7 |
| 7 | 1-Thioglycerol (50% aq. soln.)+o-phenolsulfonic acid | 3.0 | 10.9 |
| 8 | 1,2-Dithioglycerol | 6.5 | 11.1 |
| 9 | 1,2-Dithioglycerol+Al p-phenolsulfonate . 8 H₂O | 2.1 | 5.2 |
| 10 | Tert-Octyl mercaptan+Al p-phenolsulfonate . 8 H₂O | 4.0 | 10.0 |
| 11 | Thiourea | 12.0 | 33.5 |
| 12 | Thiourea+Al p-phenolsulfonate . 8 H₂O | 3.7 | 10.6 |
| 13 | Dithiobiuret | 6.3 | 17.8 |
| 14 | Dithiobiuret+Al p-phenolsulfonate . 8 H₂O | 2.5 | 8.7 |
| 15 | Allylthiourea | 10.2 | 26.7 |
| 16 | Allylthiourea+Al p-phenolsulfonate . 8 H₂O | 4.8 | 13.0 |
| 17 | Cyclohexenedimercaptan | 8.0 | 21.8 |
| 18 | Cyclohexenedimercaptan+o-phenolsulfonic acid | 3.8 | 14.1 |
| 19 | 2-Ethylhexanedithiol-1,3+o-phenolsulfonic acid | 2.3 | 6.7 |
| 20 | Thioglycolic acid+Al p-phenolsulfonate . 8 H₂O | 3.0 | 10.6 |
| 21 | Thioglycolic acid | 10.0 | 22.8 |
| 22 | beta-Mercaptoethanol | 7.5 | 25.7 |
| 23 | beta-Mercaptoethanol+Al p-phenolsulfonate . 8 H₂O | 3.3 | 7.1 |
| 24 | 2-Mercaptothiazoline | 9.4 | 21.8 |
| 25 | 2-Mercaptothiazoline+Al p-phenolsulfonate . 8 H₂O | 4.6 | 12.2 |
| 26 | Thiosalicyclic acid | 9.3 | 22.1 |
| 27 | Thiosalicyclic acid+Al p-phenolsulfonate . 8 H₂O | 4.6 | 9.9 |

EXAMPLE II

The utility of these stabilizer combinations in reducing color formation in dimethyl formamide solutions of copolymers of acrylonitrile is shown in the following series of experiments. These experiments were carried out exactly as described in Example I, and the results are shown in Tables II and III. Table II illustrates the improvement obtained when the polymer used was a copolymer of acrylonitrile made from a comonomer composition containing 95% by weight of acrylonitrile and 5% by weight of 2-vinylpyridine. The experimental results shown in Table III were obtained using a copolymer made from a comonomer composition containing 95% by weight acrylonitrile and 5% by weight styrene. The effectiveness of the combination of this invention was very clearly shown at the higher temperature level.

*Table II*

| | | $CI_{75°}$ | $CI_{125°}$ |
|---|---|---|---|
| 1 | Control | 5.8±0.5 | 26.3±3.1 |
| 2 | 1-Thioglycerol (50% aqueous solution) | 3.0 | 13.4 |
| 3 | Thioglycerol+Al p-phenolsulfonate . 8 H₂O | 2.6 | 9.3 |
| 4 | Ethylenethiourea | 3.9 | 21.3 |
| 5 | Ethylenethiourea+Al p-phenolsulfonate . 8 H₂O | 3.7 | 12.7 |
| 6 | Thiourea+Al p-phenolsulfonate . 8 H₂O | 4.0 | 12.4 |
| 7 | Allylthiourea+Al p-phenolsulfonate . 8 H₂O | 3.8 | 12.5 |
| 8 | Dithiobiuret+Al phenolsulfonate . 8 H₂O | 3.0 | 15.4 |
| 9 | 1-Thiosorbitol+Al p-phenolsulfonate . 8 H₂O | 3.7 | 9.7 |
| 10 | Thioglycolic acid | 4.0 | 18.6 |
| 11 | Thioglycolic acid+Al p-phenolsulfonate . 8 H₂O | 3.4 | 9.7 |
| 12 | Cyclohexenedimercaptan+Al p-phenolfonate . 8 H₂O | 3.6 | 11.2 |
| 13 | beta-Mercaptoethanol | 4.5 | 21.2 |
| 14 | beta-Mercaptoethanol+Al p-phenolsulfonate . 8 H₂O | 2.8 | 6.9 |

*Table III*

| | | $CI_{75°}$ | $CI_{125°}$ |
|---|---|---|---|
| 1 | Control | 10.9 | 25.0 |
| 2 | Dithiobiuret+Aluminum p-phenolsulfonate . 8 H₂O | 5.2 | 9.7 |

EXAMPLE III

The improvement in solution color obtained by using the stabilizer combinations of this invention is carried over into yarn preparation as improved yarn color and it is visually noticeable. A series of yarn samples was prepared from 20–22% solutions of polyacrylonitrile dissolved in dimethyl formamide by means of a standard dry spinning technique. When various stabilizers were tested, they were added to the dimethyl formamide and dissolved in it before the polymer was added. The finely divided polymer and dimethyl formamide were slurried together for 30 minutes and then passed to the spinning machine, which comprised a Dowtherm heated cell 6" in diameter and 12' in length. The head of the cell was heated to 130° C., which was sufficient to convert the slurry to a solution during its passage from the entrance point to the spinneret. The yarn spun in these tests was a 350-denier, 20-filament yarn spun at 300 yards per minute with a cell temperature of 250° C. Hot Kemp gas, essentially a mixture of nitrogen and carbon dioxide, was aspirated through the cell concurrently with the yarn forming. The freshly spun yarn was washed to remove residual dimethyl formamide. The washed yarn was drawn 7½ times its original length and then relaxed 10%. For comparison of the yarn samples as to color, the drawn yarn samples were knit into tubing on a 7" Wildman knitting machine, each item in the tubing being about 2" in length. A control sample, in which no stabilizer was used, was always knit adjacent to a sample whose color was to be determined so that the color comparison could be made at the knit junction. All color comparisons were made visually on these knit tubing samples. Table IV lists the results of this series of yarn preparations and shows the amount of stabilizer based on polymer used in each slurry preparation.

*Table IV*

| Sample | Stabilizer | Color Comparison |
|---|---|---|
| Control | None | Standard. |
| 1 | 1% Al p-phenolsulfonate . 8H₂O | Same as control. |
| 2 | 1% Thiosorbitol | Definite improvement. |
| 3 | 0.5% Thiosorbitol+0.5% Al p-phenolsulfonate . 8 H₂O. | Great improvement. |

EXAMPLE IV

The test used for this experiment was to heat a mixture of dimethylformamide and polymer one hour at 125° C. and measure the color as previously described. Under such conditions, the following was found using two per cent of additives based on polymer unless otherwise noted.

*Table V*

| | Experiment | Color Index |
|---|---|---|
| 1 | Control | 24.1 |
| 2 | Methanesulfonic acid | 13.2 |
| 3 | Thiosorbitol | 14.4 |
| 4 | Methanesulfonic acid+thiosorbitol | 8.5 |
| 5 | Ethanesulfonic acid | 12.2 |
| 6 | Ethanesulfonic acid+thiosorbitol | 8.1 |
| 7 | Sulfoacetic acid | 18.0 |
| 8 | Sulfoacetic acid+thiosorbitol | 12.1 |
| 9 | Aluminum p-phenolsulfonate octahydrate+thiosorbitol | 5.2 |
| 10 | Phenolsulfonic acid+thiosorbitol | 7.1 |
| 11 | Sulfuric acid (0.07%) | 14.5 |
| 12 | Sulfuric acid (0.07%)+thiosorbitol | 8.5 |
| 13 | Sulfuric acid (2%) | 17.2 |
| 14 | Sulfuric acid (2%)+thiosorbitol | 12.8 |

A variety of other acids such as organic phosphorous acids plus mercaptoalcohols did not result in striking reductions in the color index of the solution.

Yarns prepared from acrylonitrile polymers containing at least 85% acrylonitrile possess highly desirable properties and are, therefore, highly useful, particularly for industrial purposes. These yarns are prepared at the present time as described in Example III, above, by the dry spinning of dimethyl formamide solutions of the polymer. Since dimethyl formamide boils at 153° C., unusually high temperatures, usually 200°-300° C., are required in the spinning cell to evaporate the solvent. These high temperatures lead to the formation of color in the yarns prepared by this process unless the polymer solutions are appropriately stabilized. Since practically all of the color formation occurs during the dissolution and spinning operations, it is inconsequential that the stabilizer may be removed in the subsequent pressure-washing step.

The stabilizers of this invention may be added to the solvent, such as dimethyl formamide, and dissolved therein either before or after slurrying this solvent with the acrylonitrile polymer. Since the slurry must be heated to effect solution, it is essential that the stabilizer be added prior to the actual dissolving of the polymer. Although it is advantageous for the best results to convert the slurry to solution immediately prior to spinning, this is not necessary. When using the stabilizers of this invention, one can prepare the polymer solution, deaerate it in a rest tank, and feed it to the spinning operation at any desirable time without the formation of excessive color.

By "sulfoxy acid compound" is meant sulfuric acid or a compound which is a sulfonic acid or which is capable of producing a sulfonic acid in the solvent or solution media.

The acid compound used in the process of this invention can be, sulfuric acid, benzene sulfonic acid, the ortho-, meta- or para-phenolsulfonic acids, ring substituted derivatives, such as p-toluene sulfonic, 5-sulfosalicyclic, and o-sulfobenzoic anhydride, or aluminum salts of any of these acids, particularly those hydrated salts which are soluble in the dimethyl formamide or similar solvents. Particularly useful is aluminum para-phenolsulfonate octahydrate which is commercially available.

As shown in the examples, while the sulfoxy acid compounds do stabilize the polymer solution or prevent the formation of color in acrylonitrile polymer yarns spun from dimethyl formamide solutions to some extent when used alone, they must be used in conjunction with an organic sulfur compound which reacts as a thiol for the great stabilization afforded by this invention. By such a compound is meant a substance which contains the sulfhydryl group, —SH. The expression "reacts as a thiol" signifies compounds containing the sulfhydryl group or which are in equilibrium with a structure containing this group. For example, on page 534 of Whitmore's "Organic Chemistry," thiourea is shown to exist in two structures which are in equilibrium with one another. That one structure contains the —SH group is indicated by the fact that thiourea oxidizes to yield a disulfide or a sulfinic acid as is customary with —SH compounds. In addition, alkyl halides react readily to give S-alkyl compounds as proved by their hydrolysis to mercaptans. Dithiobiuret undergoes similar reactions.

This class of sulfhydryl containing compounds includes the mercaptans, polymercaptans, substituted thiols such as hydroxy substituted and the amino substituted thiols, as thiourea, dithiobiuret and their substituted derivatives. While hydrogen sulfide, methyl or ethyl mercaptan and the like will work, they are not preferred because of their low boiling points. They are useful, however, as in the preparation of solutions and in the formation of shaped articles at temperatures below their boiling points. There are many such instances as, for example, in film casting, etc. In order that the thiols not be removed too rapidly by evaporation during the spinning operation, it is preferred that the thiols used in the spinning have a boiling point in excess of 100° C. In high temperature operations, it is preferred to use sulfhydryl compounds that have boiling points of 100° C. or over. Of the various sulfhydryl compounds, hydroxy thiols and, in particular, thioglycerol and thiosorbitol are preferred.

Other sulfur-containing organic compounds, such as the sulfides, polysulfides, and heterocyclic ring compounds in which the sulfur is part of the ring are inefficient, unless, of course, they also contain a sulfhydryl group. Compounds such as naphthalene disulfonic acid, sulfosalicyclic acid, 2,4-dimethyl-3-sulfolene and para-dithiane do not react as thiols and could not be substituted therefor.

The amount of the stabilizer components used may vary from 0.1% to 2% by weight based on the weight of the polymer used. Although it is not essential, it is preferred to use equal amounts of the stabilizer components. Amounts greater than 2% of each component do not further improve the color of the spinning solution.

When the polymer and solvent mixing and slurrying are done under a blanket of nitrogen, the solution color obtained is slightly better. However, the trouble and expense involved in such a process do not make it worthwhile, and in many instances, a small increase in the amount of stabilizer will accomplish the same results.

Although the examples and discussions thus far have been directed to the use of dimethyl formamide as the solvent for the polymer, other solvents may be used, but the stabilizers are particularly helpful with solvents which either contain organic amine bases or develop them on standing or on heating. These are the amide solvents, such the N-acyl substituted secondary amines which usually involve undesirable color formation. N-formyl morpholine, like dimethyl formamide, generates amines on severe heating and such compounds are included within the spirit of the invention. Other such solvents for acrylonitrile polymers which develop amines or which may contain them as impurities are the following: N-formyl hexamethyleneimine, N-formyl pyrrolidine and the like. The amine which causes the development of the undesirable color may be substantially colorless in itself as in the case of dimethyl amine, for example. It is extremely difficult in many cases to remove the small quantities of organic amines present in the solvent and it is furthermore especially difficult to prevent the formation of small amounts of organic amines upon heating to elevated temperatures of the order of 125° C. and upward, such temperatures being frequently necessary to obtain a proper solution of the polymer or to impart to the solution the proper viscosity and other properties necessary for the formation of commercial articles. It is thought that the decomposition of these formamide derivatives to organic amine bases is especially prevalent in the presence of even traces of heavy metals, such as iron. The present invention makes possible the commercial use of such materials and solutions without the undesirable color formation, which would normally accompany their use.

It has been shown in the above examples that color formation in solutions of acrylonitrile polymers can be greatly diminished by the addition of the stabilizer combination of this invention. The improvement in the solution occurs to the same extent in shaped articles formed from the solution, since the articles acquire at least in part the color characteristics of the solutions from which they are formed when the impurities, as in the present case, are not removed during the formation of shaped articles. Thus, the present invention also makes possible the production of filaments, yarns, films, tubing, coatings and other forms of articles having greatly improved color. The improvements in color are not limited only to the formation of yarns by dry spinning techniques. Since a considerable amount of heating is required to effect solution of acrylonitrile polymers containing at least 85% acrylonitrile in dimethyl formamide, this invention is also useful in preparing articles having improved color by processes such as the casting of films, wet spinning of yarns and the like.

While the invention is of great utility when applied to polyacrylonitrile, it is especially applicable to other acrylonitrile polymers in which at least 85% by weight of the polymer is acrylonitrile. Most important of these copolymers is the readily dyeable copolymer comprising from 90% to 98% acrylonitrile by weight and from 2% to 10% by weight of a vinylpyridine, such as 2-vinylpyridine. In addition to being readily dyeable with acid dyestuffs, yarns prepared from this copolymer retain the many desirable properties of polyacrylonitrile yarns.

Although the acrylonitrile polymers containing at least 85% by weight of acrylonitrile are preferred in the practice of this invention, the invention may be applied to polymers containing lower percentages of acrylonitrile in the polymer molecule. Color formation likewise occurs in the preparation of solutions of other types of polymers due to the presence of organic bases which may, in some cases, be formed by the use of high temperatures and the invention contemplates the diminution of color in such polymers by the use of the stabilizer combination described herein.

By means of the process of this invention, it is possible to prepare solutions of acrylonitrile polymers in dimethyl formamide, which solutions are nearly colorless. The improvement in solution color leads to greatly improved yarn color. The yarn in turn can be dyed to brighter shades and is much more suitable for use in the apparel field.

These yarns, and fabrics prepared therefrom, are more stable to discoloration at high temperatures than those prepared from unstabilized solutions of acrylonitrile polymer. In addition, it has been found that the yarns from the stabilized solutions of this invention retain their tenacity for much longer periods of time at high temperatures. For example, yarn from an unstabilized solution of polyacrylonitrile in dimethylformamide was heated for twelve days at 165° C., after which its tenacity was found to be 0.6 gram/denier. On the other hand, yarn prepared from the composition 14 of Example 1, retained a tenacity of 1.9 grams/denier after heating for twelve days at 165° C.

Any departure from the procedure described herein which conforms to the principles of the invention is intended to be included within the scope of the claims below.

I claim:

1. As a new composition of matter, a mixture comprising a sulfhydryl containing substance and a sulfoxy acid compound selected from the group consisting of sulfuric acid, organic sulfonic acids and hydrated salts of organic sulfonic acids.

2. As a new composition of matter, a mixture comprising a sulfhydryl containing substance, a sulfoxy acid compound selected from the group consisting of sulfuric acid, organic sulfonic acids and hydrated salts of organic sulfonic acids and N,N-dimethylformamide.

3. As a new composition of matter, a mixture comprising a sulfhydryl containing substance, a sulfoxy acid compound selected from the group consisting of sulfuric acid, organic sulfonic acids and hydrated salts of organic sulfonic acids, N,N-dimethylformamide and a polymer of acrylonitrile.

4. As a new composition of matter, a mixture comprising a sulfhydryl containing substance and aluminum p-phenolsulfonate.

5. As a new composition of matter, a mixture comprising thioglycerol and a sulfoxy acid compound selected from the group consisting of sulfuric acid, organic sulfonic acids and hydrated salts of organic sulfonic acids.

6. As a new composition of matter, a mixture comprising thioglycerol and aluminum p-phenolsulfonate.

7. As a new composition of matter, a mixture comprising thioglycerol, aluminum p-phenolsulfonate and N,N-dimethylformamide.

8. As a new composition of matter, a mixture comprising thioglycerol, aluminum p-phenolsulfonate, N,N-dimethylformamide and an acrylonitrile polymer.

9. As a new composition of matter, a solution comprising thioglycerol, aluminum p-phenolsulfonate, polyacrylonitrile and N,N-dimethylformamide.

10. A process for preventing color formation in shaped articles prepared from acrylonitrile polymers in solutions which comprises incorporating in said solutions a sulfhydryl containing substance and a sulfoxy acid compound selected from the group consisting of sulfuric acid, organic sulfonic acids and hydrated salts of organic sulfonic acids.

11. A process for producing a substantially colorless shaped article from an acrylonitrile polymer which comprises dissolving said polymer in a solvent containing a mixture comprising a sulfhydryl containing substance and a sulfoxy acid compound selected from the group consisting of sulfuric acid, organic sulfonic acids and hydrated salts of organic sulfonic acids and shaping said article from the resultant solution.

12. A process in accordance with claim 11 in which said solvent is N,N-dimethyl formamide.

13. A process for producing a substantially colorless shaped article from polyacrylonitrile which comprises dissolving said polyacrylonitrile in N,N-dimethylformamide containing thioglycerol and aluminum p-phenolsulfonate and shaping said article from the resultant solution.

14. As a new composition of matter, a mixture comprising a sulfhydryl containing substance, a sulfoxy acid compound selected from the group consisting of sulfuric acid, organic sulfonic acids and hydrated salts of organic sulfonic acids and a polymer of acrylonitrile.

15. As a new composition of matter, a solution comprising thioglycerol, aluminum p-phenolsulfonate and a polymer of acrylonitrile.

MYRON QUENTIN WEBB.

No references cited.